Feb. 5, 1957 B. F. SCHMIDT 2,780,037
MACHINE FOR PRODUCING SPEED REDUCTION WORM GEAR
Filed July 19, 1954 2 Sheets-Sheet 1
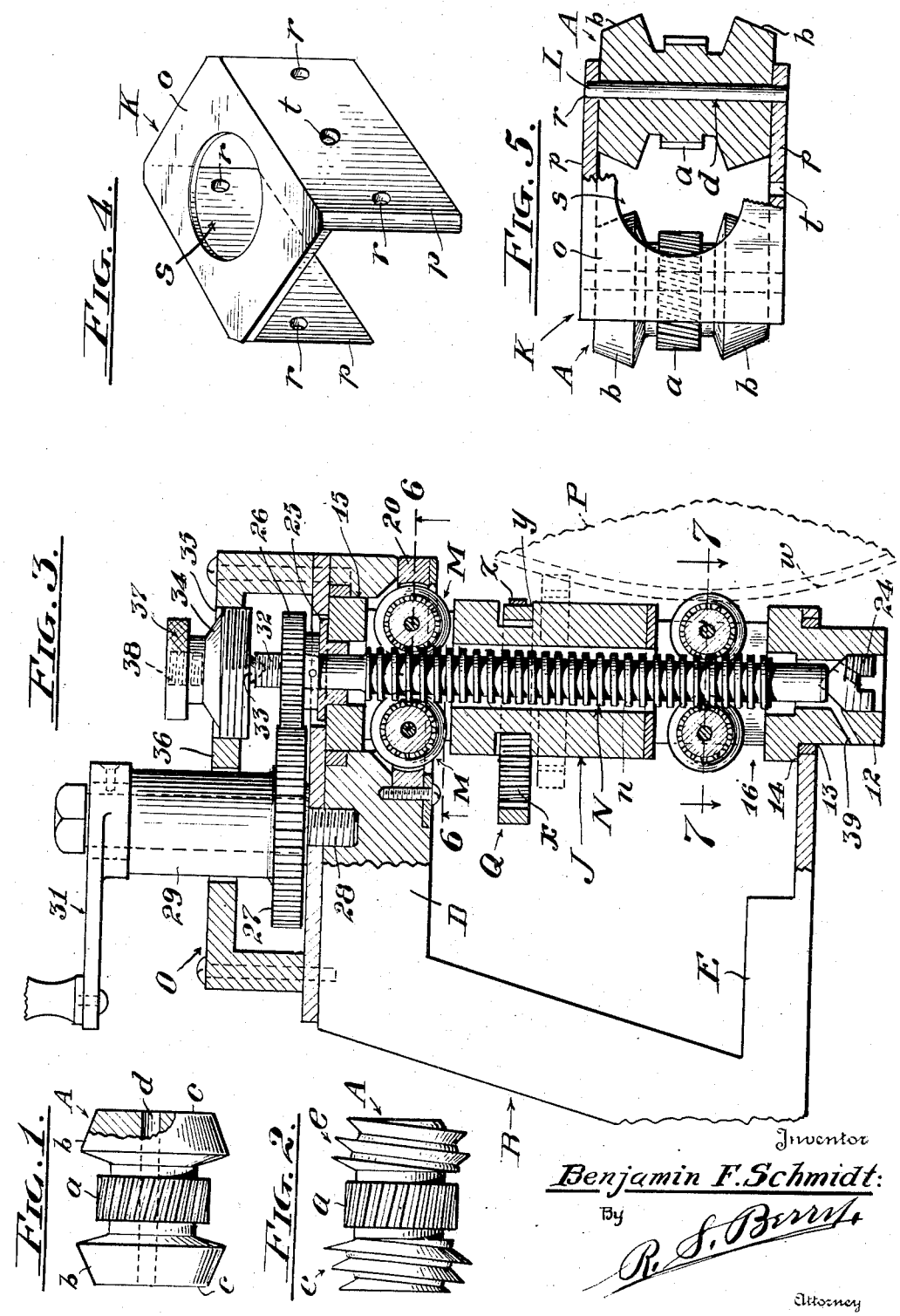
Inventor
Benjamin F. Schmidt
By
Attorney Feb. 5, 1957             B. F. SCHMIDT             2,780,037
MACHINE FOR PRODUCING SPEED REDUCTION WORM GEAR
Filed July 19, 1954             2 Sheets-Sheet 2
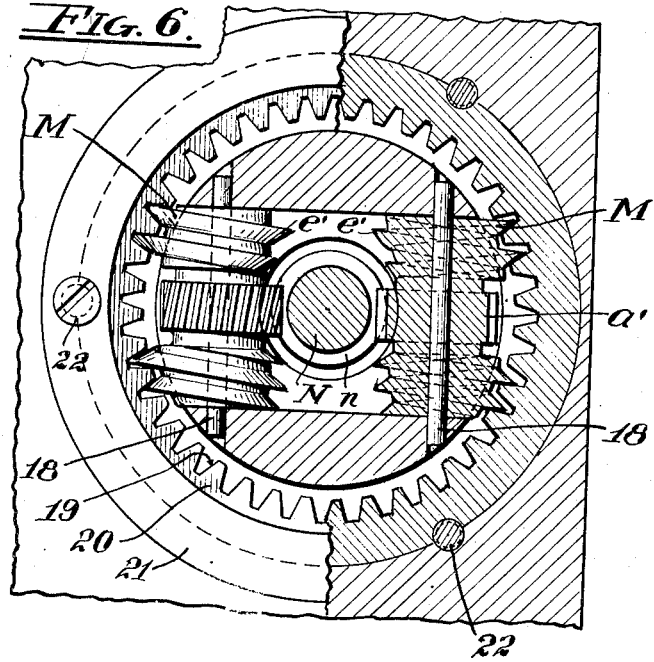
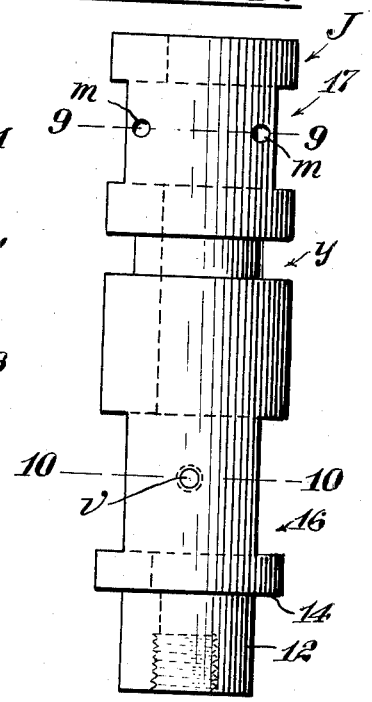
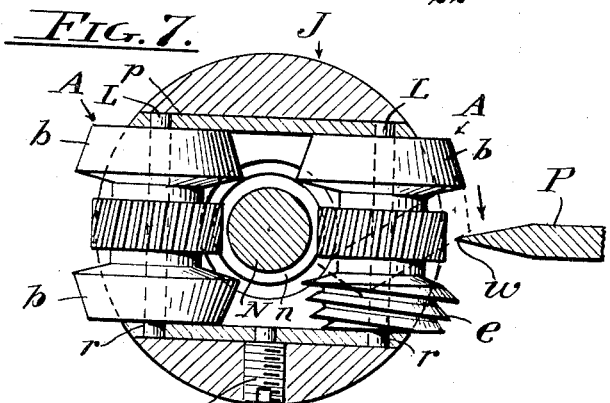
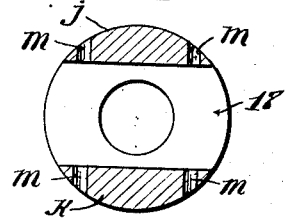
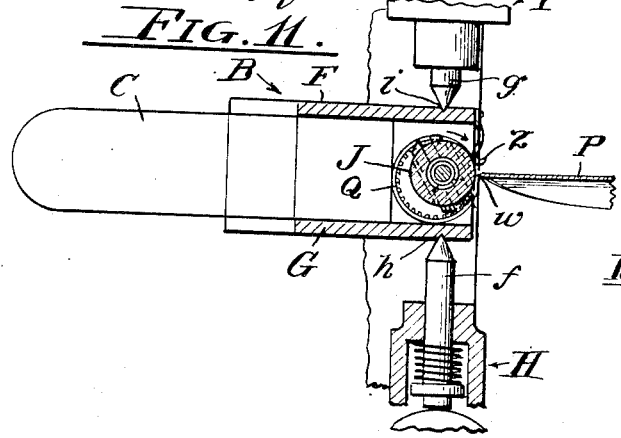
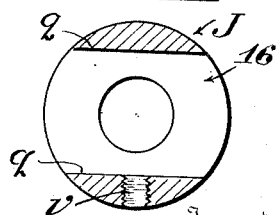
Inventor
Benjamin F. Schmidt;
By
R. S. Berry
Attorney

United States Patent Office 2,780,037
Patented Feb. 5, 1957

2,780,037
MACHINE FOR PRODUCING SPEED REDUCTION WORM GEAR

Benjamin F. Schmidt, Los Angeles, Calif.

Application July 19, 1954, Serial No. 444,071

9 Claims. (Cl. 51—108)

This invention relates to a mechanism for producing worm gears and has as its primary object the provision of a mechanism whereby a worm gear may be produced from a preformed blank in accordance with a master gear in which a master gear serving as a pattern is utilized in feeding the blank to a thread cutting or grinding tool in a fashion to form the blank with a spiral tooth having a helical pitch complementary to that of the master gear.

Another object is to provide a gear cutting mechanism whereby a positive gear transmission having exceptionally great speed reduction may be readily produced, which, while applicable to the formation of reduction gears of various sizes, is especially capable of producing small worm wheels.

Another object is to provide an effective means in a machine of the above character for holding the gear blanks and feeding same to a thread cutter or grinder during the spiral tooth forming operation and which is so constructed as to facilitate initial mounting of the blanks in a carrier and effecting subsequent removal of the formed gear.

A further object is to provide an arrangement whereby a plurality of the gear blanks may be mounted in the machine at one time and successively subjected to a thread cutting action whereby a number of the finished product may be produced in one continuous operation of the machine.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a view in elevation partly in section of the prefabricated gear blank;

Fig. 2 is a view in side elevation of the finished worm gear produced from the blank shown in Fig. 1;

Fig. 3 is a view in vertical section partly in elevation with portions removed of the mechanism employed in producing the gear shown in Fig. 2;

Fig. 4 is a perspective view of a cage utilized in holding a pair of the gear blanks in the machine during the cutting or grinding thereof;

Fig. 5 is a plan view of the cage shown in Fig. 4 partly in section illustrating the manner of assembling a pair of the gear blanks thereon preliminary to mounting in the machine;

Fig. 6 is an inverted plan view and partial section taken on the line 6—6 of Fig. 3;

Fig. 7 is an enlarged horizontal section taken on the line 7—7 of Fig. 3;

Fig. 8 is a view in side elevation of a carrier utilized in the machine for holding the cage and gear blank assembly during the gear cutting operations;

Fig. 9 is a detail in horizontal section taken on the line 9—9 of Fig. 8;

Fig. 10 is a detail in horizontal section taken on the line 10—10 of Fig. 8; and Fig. 11 is a diagram in horizontal section and plan depicting the mode of operation of the machine.

The invention contemplates the initial provision of gear blanks A of the character illustrated in Fig. 1. As here shown the gear blank embodies an intermediate portion constituting a helical gear $a$ and includes frusto-conical end portions $b$—$b$ arranged with the enlarged ends thereof presented to the gear $a$ and flanking the latter in spaced relation thereto. The frusto-conical end portions $b$—$b$ are axially aligned with the helical gear $a$ and have parallel outer end faces $c$ constituting the ends of the gear blanks which are of a diameter substantially corresponding to the diameter of the helical gear $a$. The gear blank A is formed with a cylindrical bore $d$ extending axially therethrough for the reception of a spindle on which the blank is mounted for rotation when being worked as will be later described.

The invention further contemplates and primarily resides in the provision of a mechanism whereby spiral teeth may be formed on the conical end portions $b$—$b$ of the blank A to convert such conical end portions into spiral toothed conical gears or worms $e$—$e$ as shown in Fig. 2; the helical gear $a$ being utilized in effecting rotation of the blank A in effecting the tooth cutting operation thereon, the present invention being directed to the mechanism for bodily carrying the gear blanks on an arcuate path of travel and for rotating the gear blanks round their axes while being carried. Such mechanism as here shown embodies a portable body B adapted to be removably mounted between the head and tail stocks of a thread grinding machine for presentation to a grinding wheel or cutting tool; the body as shown in Fig. 11 including a handle C on one end of which is formed a pair of connected spaced parallel upper and lower yoke members D and E flanked on their opposite sides by face plates F and G spanning the gap between the members D and E.

The device is supported between tapered centering pins $f$ and $g$ of the head and tail stocks H and I respectively of a conventional thread grinder or similar machine; the tapered ends of the pins $f$ and $g$ being engaged in shallow opposed conical recesses $h$ and $i$ in the side plates F and G. The body B is thus mounted adjacent the forward end thereof for vertical swinging movement to various adjusted positions on the pivot pins $f$ and $g$ as occasion requires.

Revolubly carried on and extending between the yoke members D and E is a tubular cylindrical carrier J having a reduced lower end portion 12 which extends through and is revolubly guided in a circular aperture 13 in the yoke member E, the carrier being formed with a shoulder 14 at the base of the reduced portion 12 which bears on the upper face of the yoke member E in sliding contact therewith. The upper end portion of the carrier J revolubly seats in a circular opening 15 in the upper yoke member D. The lower portion of the carrier J is formed with a rectangular opening 16 extending transversely therethrough which opening is provided for the reception of a removable cage K designed to receive and afford a support for the gear blank A, or for a pair of such blanks to be worked which blanks are revolubly supported on spindles L removably supported on the cage K as will be later described.

The upper end portion of the carrier J is formed with a rectangular opening 17 for the reception of a pair of master gears M—M which constitute pattern gears and which gears serve the double purpose of assisting in driving the carrier J and also acting as a guide determining the contouring of the gear blank A in the operation of cutting spiral threads on the latter, the master gears M obviously being a replica of the product gears. Each of the master gears M—M embodies an intermediate helical gear portion $a'$ flanked on each side thereof by tapered spiral toothed or worm gear portions e'—e' formed integral with the gear portion a'. The opening 17 is coextensive in width with the length of the gears M—M which latter are disposed within the opening 17 with their ends slidably abutting the side walls j—k of the opening 17, the gears M—M being spaced relative to each other and being journalled on parallel spindles 18—18 removably mounted in apertures m formed in the side walls j—k as particularly shown in Fig. 6. The spiral teeth or worms e' of the gears M mesh with internal helical gear teeth 19 on a ring 20 encompassing the cylindrical carrier J concentric therewith and fixed on the yoke member D; the ring 20 being supported in a recess on the under side of the yoke member D and rigidly held in place by a clamping plate 21 seating on the under side of the ring 20 and fastened to the yoke member D by screws 22 which engage marginal recesses in the ring 20 as shown in Fig. 6 to securely hold the ring 20 against rotation. Manifestly rotation of the gears M—M will cause them to traverse the stationary ring 20, thereby rotating the carrier J around its axis.

As a means for driving the gears M—M and thereby rotating the carrier J a worm shaft N is provided which shaft extends axially through the longitudinal bore of the carrier J and passes between the gears M—M with the spiral teeth n of the shaft meshing with the helical gear portions a'—a' of the gears M—M in driving engagement therewith. The lower end of the worm shaft N extends into the reduced lower portion 12 of the carrier J and seats on a conical end thrust bearing 24 screwed into the lower end of the carrier.

The upper end portion of the worm shaft N is journalled in a bushing 25 removably seated in the upper end of the bore of the carrier J and projects thereabove for engagement with a suitable driving mechanism here shown as embodying a spur gear 26 fastened on the shaft N. Meshing with the gear 26 is a spur gear 27 revolubly mounted on a stud shaft 28 fixed on and projecting upwardly from the yoke member D. The gear wheel 27 is formed with a hub 29 which is fitted with a hand crank 31 by which the driving mechanism may be actuated to rotate the worm shaft N under the control of an operator.

The upper terminus of the shaft N projects above the gear 26 and is seated on a downwardly extending conical bearing 33 formed on a threaded plug 34 screwed into an opening 35 in the top wall 36 of a gear housing O mounted on the upper face of the yoke member D. The bearing 33 co-operates with the bearing 24 in centering and supporting the worm shaft N.

In mounting the cage K in the opening 16 of the carrier J it is necessary to remove or at least partially withdraw the shaft N so that the lower end portion of the latter will clear the opening 16. For this purpose the protruding upper end portion of the shaft N is formed with external screw threads 32 which, on removal of the plug 34, may be engaged with an internally threaded socket on a suitable tool whereby the shaft N may be raised or lowered relative to the carrier J. The plug 34 is here shown as adapted to be utilized in this manipulation of the shaft N, which is accomplished by providing the plug 34 with a head 37 formed with an internally threaded axially disposed end recess 38 which head, on removal of the plug 34 from the opening 35 may on inverting the plug, be passed through the opening 35 and screwed into engagement with the threaded end 32 of the shaft N, and the plug then utilized as a handle for raising and lowering the shaft.

The cage K comprises a flat top wall o and parallel side walls p—p which latter are spaced apart a distance coextensive with the length of the gear blank A, and have their outer faces co-planar with the inner faces of the side walls q—q of the opening 16 to afford a sliding fit between the side wall p—p of the cage and the walls q—q on positioning the cage K in the opening 16. The collective height of the side walls p—p and the top wall o corresponds to the height of the opening 16 so that on positioning the cage K in the opening 16 the lower margins of the side walls p—p will rest on the bottom wall of the opening 16 while the upper face of the top wall o will bear against top wall of the opening as particularly shown in Fig. 3.

The side walls p—p are provided with openings r formed and arranged to slidably receive the end portions of spindles L to afford supports for the latter when mounting the gear blanks A in the cage. The top wall o of the cage is formed with an aperture s to afford a passage for the shaft N when the cage is mounted within the opening 16 of the carrier J, and one of the side walls p—p is formed with an opening t for engagement with the inner end of a screw u threaded in an opening v formed in one of the walls q so as to align and securely fasten the cage K in the opening 16.

The mounting for the blanks A in the cage K above described is such that either a single gear blank or a pair of same may be mounted on the cage in a position such that the helical gears a will be positioned for engagement with the teeth n on the worm shaft N and to position the gear blanks so that peripheral portions of the frusto-conical ends thereof will protrude from the adjacent open end of the cage K and be presented to the cutting edge w of a suitable cutting or grinding implement, here shown as comprising an inclined rotary grinding disk P. Manifestly in cutting the spiral teeth e—e on the frusto-conical end portions b—b of the gear blanks the latter are fed by rotation of the carriage K to and past the cutting edge w of the tool P which cutting edge projects diagonally into the path of the tapered peripheral portion of the gear blanks a distance corresponding to the depth of the spiral teeth to be cut, and with said cutting edge presented toward the periphery of the gear blank opposite the direction of rotation of the blank around its axis so that the tool P will act to cut a continuous spiral thread circumferentially of the gear blank.

In order to insure that a cutting action has been properly effected it is necessary to gauge the gears after the completion of a cutting operation. This is accomplished without removing the cut gears from the carrier by means of a gauge ring Q formed with helical teeth x complementary to the teeth 19 of the ring gear 20, which gauge Q encircles the carrier J and is normally seated in a circumferential channel y in the carrier, the ring gauge being held in eccentric relation to the carrier under the urge of a plate spring z arranged to bear against the outer periphery of the ring gauge to hold it clear of the disk P during rotation of the carrier J. The gauge Q is arranged on the carrier J above the opening 16 and when put to use is manually moved laterally out of engagement with the channel y and then advanced downwardly over the carrier J to move the teeth x thereon into engagement with the cut spiral teeth e on the mounted blanks A. Binding of the gauge ring Q on the then cut blanks A denotes insufficient cutting of the spiral teeth e and accordingly indicates the necessity of again subjecting the spiral teeth to further cutting or grinding action after required relative adjustment of the carrier support and the cutting edge w.

During the cutting action the gear blanks are lubricated by a stream of oil directed thereagainst in the usual manner employed in cutting and grinding operations. As a means for preventing the accumulations of cuttings within the lower end of the carrier the latter is formed with a drain passage 39 leading from the lower end of a space encompassing the lower end portion of the shaft N above the bearing 24.

In the operation of the invention either a single blank A or a pair of the blanks, is mounted on the cage K by disposing the blank between the side walls p—p with the bore d in the blanks in register with the opposed openings r whereupon a spindle L is inserted through one of the openings r and is passed through the bore d in the blank and into engagement with an opposed opening r as particularly shown in Fig. 5. The assemblage is then mounted in the opening 16 of the carrier J with the top wall $o$ of the cage abutting the top wall of the opening 16, and with the side walls $p—p$ of the cage abutting the side walls $q—q$ of the opening 16, whereupon the cage is secured in place by engaging the screw $v$ with the opening $t$ in the cage. During this operation the threaded shaft N is disposed in an elevated position clear of the opening 16 to permit insertion of the cage in the latter. On mounting of the cage being accomplished the shaft N is moved downwardly to its seated position on the bearing 24, which operation brings the threads $n$ of the shaft N in mesh with the teeth of the helical gear $a$ of the pair of blanks A—A as indicated in Fig. 3 or into engagement with the helical gear of a single blank where only one blank is mounted on the cage.

On disposing the shaft N in its lowermost position the cap 34 is screwed into the opening 35 to bring the conical bearing 33 into centering engagement with the upper end of the shaft N. The device is then positioned in proper relation to the cutting edge $w$ of the thread cutting tool P as illustrated in Fig. 11.

The cutting edge $w$ will then be disposed contiguous the periphery of the carrier J with the portion of the cutting edge $w$ in the path of travel of the projecting portions of the conical ends $b—b$ of the blanks A—A so that on rotation of the carrier J in a clockwise direction and as indicated in Figs. 7 and 11, such projecting portions will be acted on by the cutter P by rotating the shaft N so as to simultaneously rotate the pair of master gears M and the blanks A in the cage K on their respective axes, rotation of the master gears M causing them to traverse the fixed toothed ring 20 thereby effecting rotation of the carrier J. The blanks A will thus be advanced to the rotating cutter P at a speed corresponding to that of the movement of the master gears M in traversing the ring gear 20 and the gear blanks will be rotated at a speed corresponding to the speed of rotation of the master gears M—M. By disposing the cutting edge of the blade P at an incline relative to the axis of the blanks A corresponding to the helical angle of the threads $e'$ of the master gears M—M, feeding of the blanks to and past the cutting edge $w$ will effect formation of spiral teeth $e$ on the conical end portions of the blank A corresponding to the helical teeth $e'$ on the master gears M—M. When a pair of the gear blanks are mounted on the carrier J a single rotation of the latter will effect the gear cutting operation on a pair of the gear blanks.

On completion of the operation, the mechanism is moved clear of the cutting tool P or vice-versa, and the testing gauge Q manipulated as before described to determine whether the cut teeth conform to the gauge or not. If so the finished product is removed from the carrier and the cage, otherwise the blanks may be subjected to another cutting action by repeating the operation after making any adjustments as may be necessary such as adjusting the blade P. In effecting removal of the cage K the shaft N is elevated as before described to clear the opening 16, the screw $v$ is disengaged from the cage and the latter withdrawn, whereupon the mechanism is conditioned for another operation.

From the foregoing it will be seen that the invention involves initially forming a gear blank with a helical gear portion and a frusto-conical end portion, revolubly mounting the gear blank in offset perpendicular relation to the axis of a revoluble cylindrical carrier and rotating the blank around its axis and coincidentally rotating the carrier around its axis to advance the conical end portion of the blank into and past engagement with a rotary cutting tool arranged to cut a spiral thread or tooth on the periphery of the conical end section and wherein rotation of the gear blank is effected by means of a worm shaft meshed with the helical gear on the blank and wherein rotation of the carrier is also effected by means of the worm shaft acting on a helical gear having a spirally threaded end portion and revolubly mounted on the carrier to rotate around an axis spaced from and perpendicular to the axis of the carrier so that the spiral teeth on the gear wheel will traverse the stationary internal gear with which the spiral tooth is meshed and whereby the gear blank will be rotated at a peripheral speed corresponding to the peripheral speed of the driving gear and whereby the spiral tooth formed on the gear blank will be formed with a helical angle corresponding to that of the spiral tooth on the driving gear.

While a specific embodiment of the invention has been shown and described, the invention is not limited to the exact details of construction set forth, and the invention embraces such changes, modifications, and equivalents of the parts and their formation and arrangement as come within the purview of the appended claims.

I claim:

1. In a mechanism for producing a spiral thread on a frusto-conical member of a gear blank, a thread cutting tool adapted to cut a spiral thread, a revoluble carrier, gear blank holding means on said carrier adapted to present a peripheral portion of said frusto-conical member to the action of said thread cutting tool on rotation of said carrier, and means for co-incidently rotating said gear blank and said carrier continuously around their respective axes while being acted on by said cutting tool; said cutting tool having a cutting edge presented toward the periphery of said frusto-conical member opposite the direction of rotation of said gear blank so as to cut a continuous spiral thread circumferentially of said frusto-conical member as the latter revolves.

2. In a mechanism for producing a spiral thread on a frusto-conical member, a thread cutting tool having a cutting edge, a rotary carrier mounted to turn on a vertical axis, means for mounting on said carrier a member having a tapered face to be threaded for rotation on a horizontal axis and in position for engagement with the cutting edge of said tool as the carrier advances, means for continuously rotating said carrier, and means actuated by said last named means for continuously rotating said member; said cutting edge when engaged with said member being presented to the tapered face of said member opposite the direction of rotation of the latter so as to cut a continuous spiral thread circumferentially of said member as the latter revolves.

3. In a mechanism for producing a spiral thread on a frusto-conical member of a gear blank, a revoluble carrier, gear blank holding means on said carrier adapted to present a peripheral portion of the frusto-conical member to the action of a cutting tool on rotation of said carrier, a worm shaft extending axially of said carrier, a helical toothed internal ring gear stationarily encircling said carrier, a helical toothed gear mounted on said carrier intermeshing said worm shaft, a spiral gear fixed to said helical gear meshing with said internal ring gear, means for rotating said worm shaft to drive said helical gear and spiral gear to cause the latter to traverse said ring gear and thereby rotate said carrier, said worm shaft being arranged for inter-engagement with a gear blank held on said carrier to effect rotation of the blank around its axis on rotation of said worm shaft and carrier.

4. In a mechanism for forming a spiral tooth on a frusto-conical gear blank, a rotaty carrier having opposed ends, means revolubly supporting the ends of said carrier, a worm shaft in said carrier extending between said opposed ends thereof, a helical gear revolubly mounted in said carrier adjacent one end thereof meshing with said worm shaft, said helical gear having an end portion formed with a spiral tooth, a ring gear fixed on the mounting of said carrier with which said spiral tooth is engaged whereby on rotation of said worm shaft and said helical gear said carrier will be caused to rotate, means for rotating said worm shaft, means for revolubly mounting a gear blank embodying a helical gear portion and a frusto-conical end portion on said carrier with said helical gear portion interengaged with said worm shaft, and means for cutting a spiral tooth on said helical portion while said gear blank and carrier are being rotated.

5. In a mechanism for forming a spiral tooth on a frusto-conical gear blank, a tubular cylindrical carrier having opposed ends, means revolubly supporting the ends of said carrier, a worm shaft extending interiorly of said carrier axially thereof, means for rotating said worm shaft, a fixed internal ring gear encompassing said carrier adjacent one end thereof, gear connections between said worm shaft and ring gear carried on said carrier adapted on rotation thereof to traverse said ring gear and thereby rotate said carrier, means for revolubly mounting a pair of gear blanks having frusto-conical end portions and a helical gear intermediate said portions on said carrier with the intermediate portions thereof meshing with said worm shaft whereby said gear blanks will be coincidently advanced with said carrier and rotated on said carrier during rotation of the latter, and means for forming spiral teeth on the frusto-conical end portions of said gear blanks while being advanced and rotated.

6. The structure called for in claim 5 in which the means for mounting said gear blanks comprise a cage and spindles carried by said cage on which said gear blanks are revolubly supported and in which the carrier is formed with a transverse opening adapted to receive said cage, and means for fastening said cage in said opening.

7. In a mechanism for forming a spiral tooth on a frusto-conical blank, a tubular cylindrical carrier having opposed ends and formed with transverse openings extending therethrough adjacent the ends thereof, a yoke having side members in which said carrier is revolubly mounted, an internal ring gear affixed to one of said yoke members encircling said carrier opposite one of said openings, a pair of gears mounted in said last named opening having spiral teeth meshing with said ring gear and formed with helical teeth, a worm shaft extending axially of said carrier between said pair of gears meshing with said helical teeth, means for rotating said worm shaft, and means for mounting a pair of gear blanks in the other of said openings in inter-engagement with said worm shaft and to present frusto-conical end portions on said gear blanks to a cutting tool.

8. In a mechanism for forming a spiral tooth on a frusto-conical gear blank, a cage having an open end, means for revolubly supporting a gear blank in said cage with a marginal portion of the blank projecting from the open end of the cage, a revoluble cylindrical carrier having a transverse opening adapted to receive and hold said cage with the open end thereof outwardly presented, a worm shaft extending axially of said carrier through said cage engageable with a gear carried by the gear blank therein for rotating the blank, means for rotating said worm shaft, and gear connections between said worm shaft and said carrier for rotating the latter embodying a helical gear revolubly mounted on said carrier meshing with said worm shaft for actuation by the latter, a spiral toothed gear affixed to said helical gear to rotate therewith, and a fixed internal ring gear encircling said worm gear in spaced relation thereto with which said spiral toothed gear meshes and whereby rotation of said spiral toothed gear will cause it to traverse said ring gear and thereby rotate said carrier.

9. In a mechanism for producing a spiral thread on a frusto-conical gear blank, a worm shaft, means for revolubly supporting said gear blank for rotation around said worm shaft, means for driving said shaft, a gear connection between said shaft and gear blank for revolving said gear blank around its axis, a fixed ring gear encircling said shaft, a master spiral gear revolubly carried on said gear blank supporting means meshing with said ring gear, means for driving said master gear from said shaft to cause it to traverse said ring gear and thereby rotate said gear blank supporting means and bodily advance a gear blank carried thereon, and means for contouring the gear blank to form a spiral tooth thereon complementary to that of said master gear.

References Cited in the file of this patent
UNITED STATES PATENTS

| | | |
|---|---|---|
| 766,783 | Watson | Aug. 2, 1904 |
| 1,655,080 | Wildhaber | Jan. 3, 1928 |
| 1,900,112 | Hoern | Mar. 7, 1933 |
| 2,307,651 | Waldman | Jan. 5, 1943 |
| 2,356,869 | Miller | Aug. 29, 1944 |
| 2,401,810 | Aeppli | June 11, 1946 |
| 2,607,175 | Osplack | Aug. 19, 1952 |